United States Patent [19]

Fulger et al.

[11] 4,435,430

[45] Mar. 6, 1984

[54] ENZYME-SACCHARIFIED ALL NATURAL, READY-TO-EAT CEREAL FROM WHOLE CEREAL GRAIN

[75] Inventors: Charles V. Fulger, Millwood; Ernest K. Gum, Granit Springs, both of N.Y.

[73] Assignee: General Foods Corporation, White Plains, N.Y.

[21] Appl. No.: 459,422

[22] Filed: Jan. 20, 1983

[51] Int. Cl.³ .............................................. A23L 1/164
[52] U.S. Cl. ..................................... 426/18; 426/619; 426/620; 426/462; 426/466; 426/518
[58] Field of Search ...................... 426/18, 20, 21, 28, 426/49, 52, 518, 436, 479, 443, 457, 459, 460, 462, 463, 466, 620, 621, 619; 435/99

[56] References Cited

U.S. PATENT DOCUMENTS

| | | | |
|---|---|---|---|
| 2,289,416 | 7/1942 | Fine et al. | 426/28 |
| 3,788,861 | 6/1971 | Durst | 426/463 |
| 3,958,016 | 6/1976 | Galle et al. | 426/18 |
| 4,254,150 | 3/1981 | Fritze et al. | 435/99 |
| 4,282,319 | 8/1981 | Conrad | 426/18 |
| 4,311,714 | 1/1982 | Goering et al. | 426/52 |

Primary Examiner—David M Naff
Assistant Examiner—Marianne S. Minnick
Attorney, Agent, or Firm—Thomas A. Marcoux; Thomas R. Savoie; Daniel J. Donovan

[57] ABSTRACT

A process for producing an all natural, enzyme-saccharified, cereal derived from whole grain is disclosed. The process involves milling and separating the whole grain to produce a bran fraction, an endosperm fraction, and a germ fraction. The germ fraction is processed by toasting and grinding and preferably by removing bran before the toasting. The bran fraction and any bran material separated out from the ground germ is treated to increase its functionality by milling to a particle size of from 5 to 100 microns. The endosperm fraction is coarsely milled, made into a slurry, cooked and then enzymatically hydrolyzed. The final step involves recombining the processed fractions, to form a cereal dough which is further processed to produce a ready-to-eat breakfast cereal. Optionally from 1–15% of the whole grain may be malted and added into the cereal dough.

28 Claims, No Drawings

ENZYME-SACCHARIFIED ALL NATURAL, READY-TO-EAT CEREAL FROM WHOLE CEREAL GRAIN

TECHNICAL FIELD

This invention relates to a novel breakfast cereal and process for producing same. More specifically, it relates to a sweet, all natural, enzyme-saccharified, high fiber cereal derived from a whole cereal grain.

BACKGROUND ART

Processes involving the enzymatic hydrolysis of starch to form monosaccharides, disaccharides, trisaccharides, and oligosaccharides are commonly known to the skilled food artisan. U.S. Pat. No. 4,254,150 issued to Fritze et al. entitled Process For Producing a Foodstuff of Cereal teaches a process to saccharify the starch contained in the cereal to form dextrose by enzymatic degradation of the starch in the cereal grain. In this enzymatic process, all the cereal substances, both those containing starch and those not containing starch are treated together. The foodstuff produced according to this invention is claimed to have a good flavor and the dextrose content thereof is absorbed directly as sugar by the body. While such a process will saccharify the starch content of the cereal grain it is difficult to produce a cereal dough of sufficient functionality because the starch which has been saccharified is no longer present in a sufficient quantity to provide the typical matrix forming properties contributed by the endosperm.

U.S. Pat. No. 4,282,319 issued to Conrad, teaches a process for preparing in situ, enzymatically hydrolyzed protein and starch products from whole grain comprising crushing the grain, enzymatically treating the crushed grain with first an endopeptidase to transform substantially all water-soluble proteins to peptides and subjecting the remainder of the crushed grain to a starch enzymatic hydrolysis and preferably separating out the bran upon completion of the aforementioned treatments.

U.S. Pat. No. 2,289,416 issued to Fine, et al. teaches a process for preparing a cereal from whole grain comprising rupturing the bran coat of the kernels, gelatinizing the starch and then treating the gelatinized starch with a starch splitting enzyme to convert the majority of the starch to dextrins and sugars. After the treatment has been completed (in approximately 2 hours at 60°–70° C.) the converted grain is heated to inactive the enzyme, dried, tempered and processed to produce a toasted product in flaked, shreaded or other desired form.

It is therefore an object of the present invention to hydrolyze polysaccharides and starches present in the cereal grain to effect substantial sweetness in the final cereal product. Another object of the present invention is a process to obtain a self-sweetened food product especially a ready-to-eat breakfast cereal without the addition of sugars.

It is also an object of the present invention to increase the moisture absorption, organoleptic qualities, palatability and texture forming properties of the bran component of the cereal grain to replace the matrix forming properties of the endosperm lost as a result of the in situ conversion of starch. In a like manner, the protein component present within the germ fraction of the whole grain, after functional modification, is utilized in the present invention to matrix the grain syrup which results from the saccharification of starch.

It is an additional object of the present invention to supply a ready-to-eat cereal product containing an increased level of dietary fiber, as compared to typical breakfast cereals.

DISCLOSURE OF THE INVENTION

The present invention involves a new process to produce a sweet, all natural, enzyme-saccharified, cereal derived from a whole cereal grain.

The starting material for this process is the whole cereal grain which is then subsequently milled and separated to produce a bran fraction, an endosperm fraction and a germ fraction. Optionally, the cereal grain fractions may be obtained from suppliers and utilized in the same proportion as present in the whole cereal grain and processed according to this invention. Each of the three components undergo separate treatments and are recombined to form a cereal dough such that all three fractions are present in the same ratio as present in the starting whole grain.

The grain fraction which contains a high level of high quality protein but which also contains a major amount of bran and oil is toasted and comminuted for optimum matrix performance and shelf stability. The germ is toasted at from 110° C. to 160° C., preferably from 130° C. to 155° C. for 15 to 175 minutes, preferably from 20 to 30 minutes and then the toasted germ is ground to an average particle size of from 0.25 to 2.0 millimeters. If ground too fine, the bran-free germ will develop off-flavors. Optionally, before the germ is toasted, any bran material present therein is separated out (i.e. by air classification) and is combined with the bran fraction of the cereal grain.

The bran fraction either alone or combined with the bran material which was separated out from the ground germ (if that optional embodiment is utilized) must be treated to improve its functionality. The bran treatment is essential to the invention because if the majority of the starch-containing endosperm is saccharified, another ingredient must then replace the starch as the matrix of the cereal. The treated bran is a functional material which will possess increased texture-forming properties. Also the treated bran will not have the gritty mouthfeel characteristic of conventional bran containing cereals.

The bran treatment process comprises milling the bran fraction to an average particle size of from 5 to 100 microns, preferably from 20 to 60 microns. The bran material obtained thereby possesses the desired functionality and texture-forming properties to help replace the starch, which has been saccharified, as the matrix of the cereal. For further disclosure on this concept, attention is directed to the commonly-assigned, U.S. patent application Ser. No. 457,994 filed Jan. 14, 1983 entitled Micromilling of Bran and Product which is herein incorporated by reference.

The endorsperm fraction which consists essentially of starch, is milled to a particle size less than 2 millimeters for optimal water, heat and enzyme penetration. The milled endosperm, 15 to 60% by weight in a slurry, is cooked by any suitable means until substantially all the starch is gelatinized and then enzymatically hydrolyzed to form soluble saccharides. From 15 to 75% by weight of the endosperm is enzymatically hydrolyzed, preferably from 50 to 60%. The soluble saccharide produced is preferably glucose. The endorsperm fraction is enzymatically saccharified until from 7.5 parts sucrose-equivalent sweetness to 50 parts sucrose-equivalent sweetness is present in the final breakfast cereal product, as consumed. Preferably, the endosperm fraction is enzymatically saccharified until from 10 parts sucrose-equivalent sweetness to 45 parts sucrose-equivalent sweetness is present, and most preferably until from 35 parts sucrose-equivalent sweetness to 40 parts sucrose-equivalent sweetness is present in the final breakfast cereal product, as consumed.

The endosperm fraction after milling can be cooked in a number of different ways to effect the substantial gelatinization of the starch present therein. The starch gelatinization of the endosperm fraction may be accomplished by steam injection in a jet cooker at from 140° to 165° C. in the presence of a thermally stable α-amylase for a period of time varying from one second to 60 seconds. The starch gelatinization may also be accomplished by cooking in a pressurized chamber, such as an autoclave or a rotary cooker at 100° to 140° C. for 5 to 60 minutes with or without the addition of a thermally stable α-amylase. Also the dry endosperm starch may be slurried and gelatinized by heating to 110° to 160° C. in an extruder and then diluted further to give the 15 to 60% by weight concentration of the endosperm prior to enzymatic hydrolysis.

A cereal dough is then obtained by combining the converted ingredients, namely the toasted germ, the modified bran and the enzymatically hydrolyzed endosperm such that the dough contains whole grain levels of protein, fiber and digestible carbohydrates. The cereal dough can be further processed using typical breakfast cereal manufacturing techniques to obtain a ready-to-eat breakfast cereal.

An optional modification of the process involves malting an amount of whole grain equivalent to 1–15% of the starting material, milling the malted grain to a flour consistency, and combining malted grain flour with the converted grain fractions. Preferably, bran material is separated from the milled malted grain prior to the addition of the malted grain to the cereal dough. The bran material which is separated out is added to the bran fraction of the cereal grain to be processed therewith. The best results were observed, when the malt flour was added to the saccharified endosperm, bran and germ before the final cereal dough product was formed.

In food applications where the oil contained within the germ fraction is not desirable in the final product, such as in a cereal designed to be predominately fat-free, the oil contained within the germ fraction may be separated out by solvent extraction or expulsion prior to toasting.

Alternately, the germ can be separated from the bran fragments preferably by air classification and the full fat germ particles are then bumped, dehydrated and/or toasted. This treatment, by basically maintaining the oil droplets in the natural cell environment, encapsulated by the cell matter that contains desirable natural antioxidants, can result in full fat germ particles with suitable shelf stability in the finished cereal product.

The protein contained within the germ fraction is a useful, functional ingredient which replaces some of the lost functional properties attributable to the starch. The protein acts in its texture promoting role by matrixing with the endosperm syrup. The protein will matrix with the syrup best when the oil content of the germ has been removed prior to the formation of the cereal dough.

While the hydrolysis of the polysaccharides can be obtained by a variety of enzymes and processes, the preferred process consists of a 1 to 4 hour treatment of cooked or uncooked grain endosperm fractions at 18 to 55% solids. A dual enzymatic reaction involving bacterial α-amylase simultaneously with a fungal glucoamylase is preferred. A pH of from 4.5 to 6.0, preferably 4.8 to 5.2 is utilized and the temperature range will vary from approximately 40°–75° C., preferably from 55° to 70° C.

It is possible to vary the level of sweetness by controlling either the solids concentration or the amount of the incorporated saccharide into the final cereal dough. Additionally, the total sweetness of the cereal product can be controlled by either limiting the enzyme reaction on the starch of the endosperm or by not saccharifying an aliquot of the endosperm fraction. It is not desirable to separate the sweet liquid obtained by the hydrolysis of the endosperm fraction from the residual solids. The residual unreacted endosperm structure, if not physically disrupted by separation, is beneficial in aiding in matrix formation. Additional advantages of this process include the fact that the conversion takes place fairly rapidly and the reaction may take place within a single vessel.

Appropriate cereal grains which may be utilized in conjunction with the present invention include corn, wheat, oat, barley, buckwheat, rye, rice, sorghum, and millet.

Since the endorsperm contains in excess of 95% of the starch present in the whole grain, it is the only fraction of the whole grain which undergoes enzymatic treatment. Since there is only a low level of the starch component within the malted grain, it is not generally regarded to be economically worthwhile to subject the malt flour to enzymatic treatment. However, the malt flour could be added to the endosperm before gelatinization and saccharification to convert the residual starch in the malt flour into sugar. It is undesirable to treat the germ or fiber fraction enzymatically because off-flavors may develop. The process of the present invention will not produce any off-flavors because the endosperm is emzymatically saccharified separately.

To achieve optimum product quality, some food ingredients which were not necessarily treated for sweetness or fiber functionally, i.e. cereal products like rolled oats or buckwheat can be added for flavor, texture advantage or for ease of process conversion. Other untreated ingredients can also be included, i.e. nuts, rasins, honey, etc. for product desirability.

While it is anticipated that the inventive process will have its greatest utilization in the area of the production of ready-to-eat breakfast cereals, other logical product applications other than breakfast cereals would include but not be limited to snack food items, baby foods, main meal items, side dishes, desserts, cake ingredients and as a pet food or pet food ingredient.

The converted ingredients which make up the cereal dough can be further processed using typical breakfast cereal manufacturing techniques, singly, in groupings or in sequences to obtain a marketable ready-to-eat cereal product. In a simple and convenient way, the converted ingredients (modified bran, germ, malt and saccharified endosperm) were combined and dried/toasted on steam drying rolls at a moderately high temperature (approximately 150° C.). This process step reduced the thick slurry of the combined materials into a malty, pleasant tasting, crisp eating, cereal material. When consumed with milk, the flaky cereal as obtained from the drying rolls retained a remarkable crispness in the fluid. Considering the high simple sugar content, this was surprising and unexpected and was found to be due to the presence of the modified fibers of the bran without which the cereal would rapidly developed a limp texture that would soon disintegrate in the milk.

The heat, (for example, of the steam drying rolls) was instrumental in developing a desirable composite flavor where the cereal flavor inherent particularly in the bran the nutty flavor of the germ, the sweetness and flavor of the saccharified endosperm and the toasted flavor of the malt combined into a pleasant and high flavor level.

The recombined, converted grain components which make up the cereal dough could be processed into a ready-to-eat cereal several other conventional ways including but not limited to the following methods:

(1) Partially drying the materials of the combined ingredients to a doughy consistency. Forming, extruding the material into pellets on equipment like Buhler or Ambretti extruders, drying the pellets to a yet lower moisture level, flaking the pellets (e.g., on a non-differential flaking mill), and toasting the flakes to a desirable flavor.

(2) Reducing the moisture level of the material to a doughy consistency and forming shapes of choice on a cookie cutter using known techniques followed by toasting the particles.

(3) It is even possible that if the total conversion of the starch of the grain for sweetness is not necessary, an endosperm or starch fraction of the unsaccharified portion of the grain could be recombined with the converted grain fractions, and the material expanded by one of several known techniques.

The invention is further illustrated, but not limited by the following examples:

EXAMPLE I

An all corn cereal was prepared according to the following procedure. Corn grain was divided into two portions, the major proportion (95%) was coarsely milled and separated into endosperm, germ and primary bran fractions. The other portion, 5%, was malted as described later in the example. The endosperm fraction (brewers grits size—2 mm diameter was slurried at 20% w/w in water and cooked at 121° C. for 30 minutes. Part of the cooked endosperm was saccharified as follows. The pH was adjusted to 5.0 with 3 N HCl, the Ca++ level of the solution was brought to 330 ppm and the temperature was controlled at 60° C. Then α-amylase, Novo Termamyl T-60 (1.6 ml/kg endosperm) and glucoamylase Miles Diazyme L-100 (6.6 ml/kg endosperm) were added to the stirred slurry. After 2 hours of reaction, 65% of the endosperm weight had been converted to glucose.

The germ fraction underwent air classification to separate out bran material. The bran-free germ fraction with the oil content intact was toasted at 150° C. for 30 minutes and ground to 10 U.S. Standard Screen (approximately 2.0 mm).

The primary bran fraction and the bran material removed from the germ fraction was milled to an average particle size of 40 microns using a combination of the Model M-1 Mill and C-1 Air Classifier manufactured by Vortec Products Company (Long Beach, CA) in the manner disclosed by copending U.S. patent application Ser. No. 457,994 filed on Jan. 14, 1983.

The corn malt was prepared according to the following malting process. A thin layer of seed corn was placed on wire mesh screens. Two shelves of the screens were inserted in an enclosed dark chamber with air flow. The corn was sprouted in the chamber with a two second blast of 24° C. $H_2O$ in every 5 minutes through a wide angle nozzle. The corn was harvested after 72 hours of sprouting. At this time, the sprouted corn had 1½-2" long sprouts and roots. The sprouted corn has 2.6% (dry base) of reducing sugar, while the non-sprouted corn contains only 0.7%. The sprouted corn was dried in an air-oven at 149° C. (300° F.) for 45 minutes. The drying process increased the reducing sugar content to 8–9% and developed an excellent corn malt flavor. The dried corn was grounded to 20 mesh particle size.

A ready-to-eat breakfast cereal was prepared by combining the saccharified endosperm and cooked endosperm to give the level of sweetness desired; adding the malt, germ and bran fractions then drying the slurry on steam rolls at 149° C. (300° F.) at 4 rpm. The final dry weight composition of the flakes was 73.5% endosperm (at least 37% was saccharified endosperm fraction), 10.5% milled bran fraction, 10.5% toasted full-fat germ fraction, 5% corn malt and 0.5% salt.

EXAMPLE II

Wheat farina, the endosperm fraction of the wheat grain, was purchased from a grain manufacturer and was saccharified according to the procedure outlined in Example I. Upon analysis, it was determined that 53% by weight of the endosperm was saccharified and converted to glucose. Wheat bran was purchased from International Multifoods and milled to an average particle size of 60 microns using the apparatus and procedure as outlined in Example I. Milled, solvent-defatted wheat germ was purchased from Vitamins, Inc. This represents the germ fraction wherein the oil contained within the germ was removed prior to the toasting and grinding of the germ. Wheat malt was purchased from National Malting Corporation. The saccharified endosperm, the 60 micron sized wheat bran, the solvent-defatted wheat germ and the wheat malt were combined to form a cereal dough. The cereal dough obtained therefrom contained the same proportion of each of the cereal grain fractions (or hydrolyzed products obtained therefrom) as is contained in the whole wheat grain (with the exception of the oil which was removed from the germ). A small amount of salt was added to the cereal dough. Cereal flakes were prepared on steam rolls as in Example I and the finished product, a ready-to-eat breakfast cereal, contained approximately 79% saccharified wheat endosperm, 10.5% milled wheat bran, 5% solvent-defatted wheat germ, 5% wheat malt and 0.5% salt.

We claim:

1. A process for preparing an enzyme-saccharified, ready-to-eat cereal derived from a whole cereal grain comprising:
   (a) milling and separating a whole cereal grain to produce a germ fraction, a bran fraction and an endosperm fraction;
   (b) processing the germ fraction by:
      (i) toasting the germ fraction, and
      (ii) grinding the toasted germ to a particle size of from 0.25 to 2.0 millimeters;

(c) treating the bran fraction to improve its functionality by milling said bran fraction to a particle size of from 5 to 100 microns;

(d) processing the endosperm fraction by:
  (i) milling to a practicle size less than 2 millimeters,
  (ii) forming a slurry containing from 15 to 60% by weight of said milled endosperm,
  (iii) cooking the milled endosperm until substantially all the starch is gelatinized, and
  (iv) enzymatically hydrolyzing from 15 to 75% by weight of said endosperm to form soluble saccharides such that the ready-to-eat cereal contains from 7.5 parts sucrose-equivalent sweetness up to 50 parts sucrose-equivalent sweetness;

(e) recombing the ground, toasted germ of step (b)(ii), the milled bran of step (c) and the enzymatically hydrolyzed endosperm of step (d)(iv) to form a cereal dough containing whole grain levels of protein, fiber and digestible carbohydrates;

(f) obtaining a ready-to-eat cereal from said cereal dough.

2. The process according to claim 1 wherein the whole grain is corn, wheat, oats, barley, rye, buckwheat, rice, sorghum, or millet.

3. The process according to claim 1 additionally comprising the steps of:
(a) malting an amount of whole grain equivalent to 1 to 15% of the whole cereal grain;
(b) milling the malted grain to a flour consistency; and
(c) adding said malted grain flour to the cereal dough of claim 1, step (e).

4. The process of claim 1 wherein the enzymatic hydrolysis of the endosperm comprises a treatment process whereby the endosperm at a 18-55% solids content is subjected to the enzymatic action of α-amylase simultaneously with fungal glucoamylase at a pH of from 4.5 to 6 at a temperature of 40° to 75° C. for 1 to 4 hours.

5. The process of claim 4 wherein the pH is from 4.8 to 5.2 and the temperature is from 55° to 70° C.

6. The process according to claim 1 wherein oil contained within the germ fraction is separated out by extraction or expulsion prior to toasting.

7. The process according to claim 1 wherein the germ fraction is toasted at a temperature of from 110° C. to 160° C. for 15 to 175 minutes.

8. The process according to claim 7 wherein the germ fraction is toasted at a temperature of from 130° C. to 155° C. for 20 to 30 minutes.

9. The process of claim 1 wherein the germ fraction is first processed by separating bran material out of said fraction prior to toasting, said bran material additionally being added to the bran fraction of claim 1 step (c) to be processed therewith.

10. The process of claim 3 wherein bran material is separated from the milled malted grain prior to the addition of the malted grain to be the cereal dough, said bran material additionally being added to the bran fraction of claim 1 step (c) to be processed therewith.

11. The process of claim 1 wherein the ready-to-eat cereal contains from 10 parts sucrose-equivalent sweetness to 45 parts sucrose-equivalent sweetness.

12. The process of claim 11 wherein the ready-to-eat cereal contains from 35 parts sucrose-equivalent sweetness to 40 parts sucrose-equivalent sweetness.

13. The process according to claim 1 wherein said bran fraction is milled to a particle size of from 20 to 60 microns.

14. The product produced by the process of claim 1.

15. A process for preparing an enzyme-saccharified ready-to-eat cereal derived from whole cereal grain fractions, said fractions comprising a germ fraction, a bran fraction and an endosperm fraction, all of said fractions being derived from a cereal grain, said fractions being present in the same proportions as present in the whole cereal grain, said process comprising:

(a) processing the germ fraction by:
  (i) toasting the germ fraction, and
  (ii) grinding the toasted germ to a particle size of from 0.25 to 2.0 millimeters;

(b) treating the bran fraction to improve its functionality by milling said bran fraction to a particle size of from 5 to 100 microns;

(c) processing the endosperm fraction by:
  (i) milling to a particle size less than 2 millimeters,
  (ii) forming a slurry containing from 15 to 60% by weight of said milled endosperm,
  (iii) cooking the milled endosperm until substantially all the starch is gelatinized, and
  (iv) enzymatically hydrolyzing from 15 to 75% by weight of said endosperm to form soluble saccharides such that the ready-to-eat cereal contains from 7.5 parts sucrose-equivalent sweetness up to 50 parts sucrose-equivalent sweetness;

(d) recombining the ground, toasted germ of step (a)(ii), the milled bran of step (b) and the enzymatically hydrolyzed endosperm of step (c)(iv) to form a cereal dough containing whole grain levels of protein, fiber and digestible carbohydrates;

(e) obtaining a ready-to-eat cereal from said cereal dough.

16. The process according to claim 15 wherein the whole grain is corn, wheat, oats, barley, rye, buckwheat, rice, sorghum, or millet.

17. The process according to claim 15 additionally comprising the steps of:
(a) malting an amount of whole grain fractions equivalent to 1 to 15% of the whole cereal grain;
(b) milling the malted grain to a flour consistency; and
(c) adding said malted grain flour to the cereal dough of claim 15, step (d).

18. The process of claim 15 wherein the enzymatic hydrolysis of the endosperm comprises a treatment process whereby the endosperm at a 18-55% solids content is subjected to the enzymatic action of α-amylase simultaneously with fungal glucoamylase at a pH of from 4.5 to 6 at a temperature of 40° to 75° C. for 1 to 4 hours.

19. The process of claim 18 wherein the pH is from 4.8 to 5.2 and the temperature is from 55° to 70° C.

20. The process according to claim 15 wherein oil contained within the germ fraction is separated out by extraction or expulsion prior to toasting.

21. The process according to claim 15 wherein the germ fraction is toasted at a temperature of from 110° C. to 160° C. for 15 to 175 minutes.

22. The process according to claim 21 wherein the germ fraction is toasted at a temperature of from 130° C. to 155° C. for 20 to 30 minutes.

23. The process of claim 15 wherein the germ fraction is first processed by separating bran material out of said fraction prior to toasting, said bran material additionally being added to the bran fraction of claim 15 step (b) to be processed therewith.

24. The process of claim 17 wherein the bran material is separated from the milled malted grain prior to the addition of the malted grain to the cereal dough, said bran material additionally being added to the bran fraction of claim 15 step (b) to be processed therewith.

25. The process of claim 15 wherein the ready-to-eat cereal contains from 10 parts sucrose-equivalent sweetness to 45 parts sucrose-equivalent sweetness.

26. The process of claim 25 wherein the ready-to-eat cereal contains from 35 parts sucrose-equivalent sweetness to 40 parts sucrose-equivalent sweetness.

27. The process according to claim 1 wherein said bran fraction is milled to a particle size of from 20 to 60 microns.

28. The product produced by the process of claim 15.

* * * * *